(12) United States Patent
Tonnemacher et al.

(10) Patent No.: US 9,913,146 B2
(45) Date of Patent: Mar. 6, 2018

(54) USING GEOGRAPHICAL FEATURES TO REDUCE IN-FIELD PROPAGATION EXPERIMENTATION

(71) Applicant: Southern Methodist University, Dallas, TX (US)

(72) Inventors: Matthew Tonnemacher, Dallas, TX (US); Dinesh Rajan, Dallas, TX (US); Joseph Camp, Dallas, TX (US)

(73) Assignee: Southern Methodist University, Dallas, TX (US)

( * ) Notice: Subject to any disclaimer, the term of this patent is extended or adjusted under 35 U.S.C. 154(b) by 0 days.

(21) Appl. No.: 15/399,940

(22) Filed: Jan. 6, 2017

(65) Prior Publication Data

US 2017/0195892 A1    Jul. 6, 2017

Related U.S. Application Data

(60) Provisional application No. 62/275,586, filed on Jan. 6, 2016.

(51) Int. Cl.
*H04B 17/00* (2015.01)
*H04W 24/00* (2009.01)
(Continued)

(52) U.S. Cl.
CPC .......... *H04W 16/22* (2013.01); *H04B 17/318* (2015.01); *H04W 4/02* (2013.01); *H04W 24/02* (2013.01); *H04W 24/08* (2013.01)

(58) Field of Classification Search
CPC ..... H04W 4/028; H04W 4/046; H04W 16/22; H04W 24/06; H04W 28/0231;
(Continued)

(56) References Cited

U.S. PATENT DOCUMENTS 6,606,494 B1 *   8/2003   Arpee .................... H04W 24/00
                                                       455/421
6,711,404 B1 *   3/2004   Arpee .................... H04W 16/18
                                                       455/423
(Continued)

OTHER PUBLICATIONS

Akimoto, M., et al., "Path Loss Estimation of 2 GHz and 5 GHz Band FWA within 20 km in Rural Area," International Symposium on Antennas and Propagation, ISAP Nov. 1-4, 2006, 6 pp.
(Continued)

*Primary Examiner* — Simon Nguyen
(74) *Attorney, Agent, or Firm* — Edwin S. Flores; Daniel J. Chalker; Chalker Flores, LLP

(57) ABSTRACT

The present invention includes an apparatus and method for determining cell coverage in a region with reduced in-field propagation measurements comprising: obtaining geographical features of the region; predicting the number of measurements required to accurately characterize its path loss; determining the path loss prediction accuracy of wardriving and crowdsourcing by oversampling a suburban and a downtown region from cell measurements that comprise signal strength and global positioning system coordinates; and using statistical learning to build a relationship between these geographical features and the measurements required, thereby reducing the number of measurements needed to determine path loss accuracy.

22 Claims, 5 Drawing Sheets

(51) Int. Cl.
*H04W 16/22* (2009.01)
*H04B 17/318* (2015.01)
*H04W 4/02* (2018.01)
*H04W 24/02* (2009.01)
*H04W 24/08* (2009.01)

(58) Field of Classification Search
CPC  H04W 28/0236; H04W 40/18; H04B 17/318; H04B 17/373; H04B 17/391
USPC .................................. 455/67.11, 67.16, 423
See application file for complete search history.

(56) References Cited

U.S. PATENT DOCUMENTS

| | | | | |
|---|---|---|---|---|
| 8,385,908 | B2* | 2/2013 | Ivarez Medina | H04L 41/147 455/423 |
| 2002/0058503 | A1* | 5/2002 | Gutowski | H04W 24/00 455/423 |
| 2002/0142788 | A1* | 10/2002 | Chawla | H04W 16/18 455/504 |
| 2004/0116111 | A1* | 6/2004 | Saunders | H04W 16/18 455/423 |
| 2006/0019679 | A1* | 1/2006 | Rappaport | H04W 64/00 455/456.5 |
| 2006/0262731 | A1* | 11/2006 | Carlson | H04L 25/0214 370/252 |
| 2011/0287801 | A1* | 11/2011 | Levin | H04B 17/391 455/517 |
| 2015/0264519 | A1* | 9/2015 | Mirzaei | H04W 4/02 455/457 |
| 2016/0161592 | A1* | 6/2016 | Wirola | G01S 5/0252 702/150 |

OTHER PUBLICATIONS

Allsebrook, K., et al., "Mobile Radio Propagation in British Cities at Fequencies in the VHF and UHF Bands," IEEE Transactions on Vehicular Technology, vol. VT-26, No. 4, Nov. 1977, pp. 313-323.
Deng, S., et al., "WiFi, LTE, or Both? Measuring Multi-Homed Wireless Internet Performance," in Proceedings of the 2014 Conference on Internet Measurement Conference, ACM, Nov. 5-7, 2014, pp. 181-194.
Huang, J., et al., "A Close Examination of Performance and Power Characteristics of 4G LTE Networks," in Proceedings of the 10th International Conference on Mobile Systems, Applications, and Services, ACM, Jun. 25-29, 2012, pp. 225-238.
Phillips, C., et al., "A Survey of Wireless Path Loss Prediction and Coverage Mapping Methods," IEEE Communications Surveys & Tutorials, vol. 15, No. 1, First Quarter 2013, pp. 225-270.
Robinson, J., et al., "Assessment of Urban-Scale Wireless Networks with a Small Number of Measurements," in Proceedings of ACM MObiCom, Sep. 14-19, 2008, 12 pp.
Shin, H., "Measurements and Models of 802.11B Signal Strength Variation Over Small Distances," A thesis submitted to the Faculty of University of Delaware, Winter 2010, 107 pp.
Sklar, B., "Rayleigh Fading Channels in Mobile Digital Communication Systems, Part I: Characterization," IEEE Communications Magazine, Jul. 1997, pp. 90-100.
Neidhardt, E., et al., "Estimating Locations and Coverage Areas of Mobile Network Cells based on Crowdsourced Data," Wireless and Mobile Networking Conference (WMNC), 6th Joint IFIP, IEEE, Apr. 23-25, 2013, pp. 1-8.
"OpenStreetMap," www.openstreetmap.org, license: http://www.openstreetmap.org/copyright, accessed May 10, 2017, 2 pp.

* cited by examiner

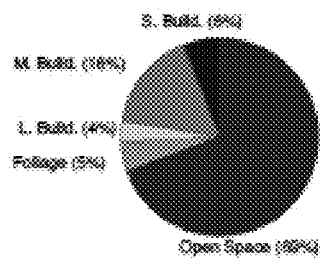 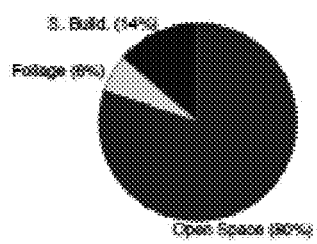
(a) Downtown  
FIG. 4A
(b) Suburban  
FIG. 4B
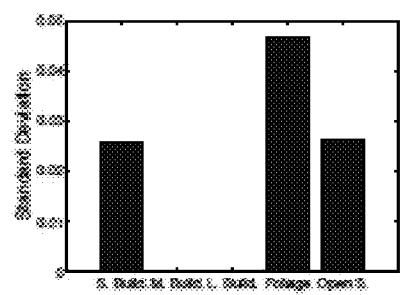 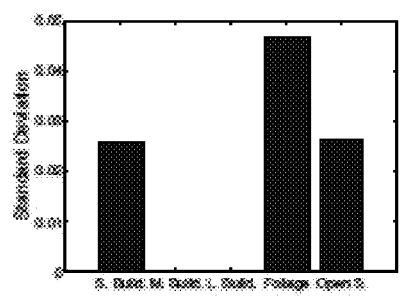
(a) Downtown  
FIG. 5A
(b) Suburban  
FIG. 5B
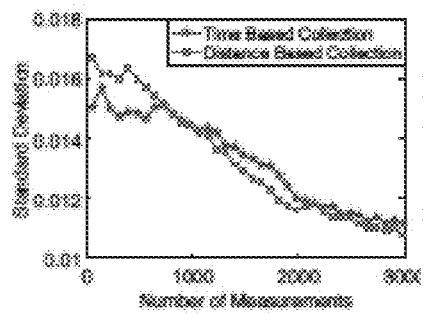 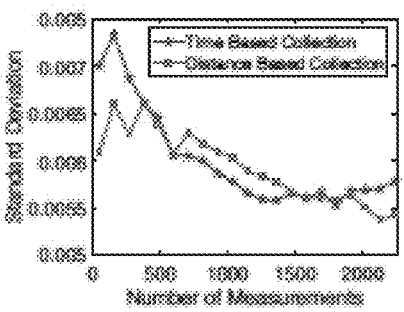
(a) Downtown  
FIG. 6A
(b) Suburban  
FIG. 6B (a) Real User Clusters (b) Clusters Superimposed on Local Measurements (a) Downtown (b) Suburban

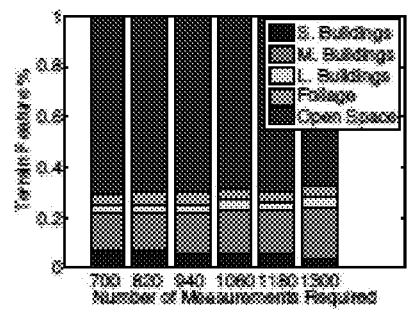
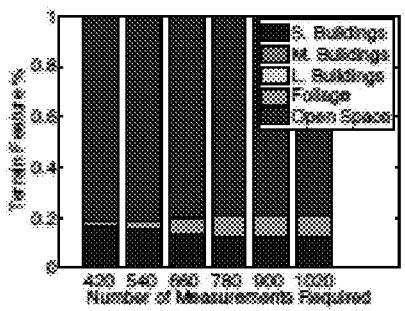
FIG. 10A     FIG. 10B
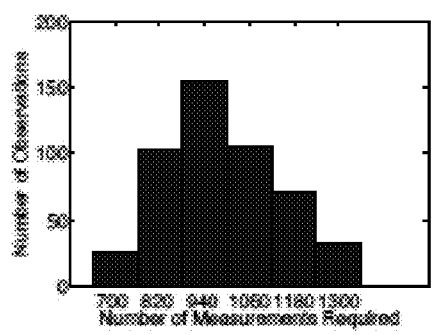
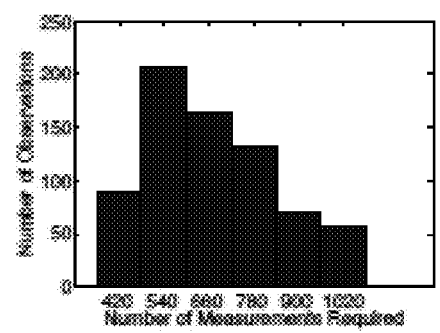
FIG. 11A     FIG. 11B
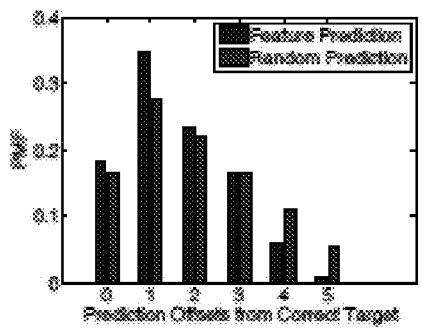
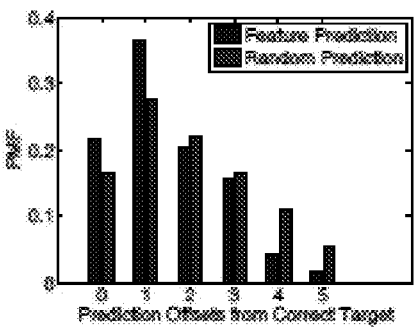
FIG. 12A     FIG. 12B

USING GEOGRAPHICAL FEATURES TO REDUCE IN-FIELD PROPAGATION EXPERIMENTATION

CROSS-REFERENCE TO RELATED APPLICATIONS

This application claims priority to U.S. Provisional Application Ser. No. 62/275,586, filed Jan. 6, 2016, the entire contents of each are incorporated herein by reference.

STATEMENT OF FEDERALLY FUNDED RESEARCH

This invention was made with government support under contract CNS-0958436, CNS-1150215, and CNS-1526269 awarded by the National Science Foundation. The government has certain rights in the invention.

TECHNICAL FIELD OF THE INVENTION

The present invention relates in general to the field of to the expense of in-field experimentation (i.e., wardriving), and more particularly, to a novel method of using geographical features to reduce in-field propagation experimentation.

BACKGROUND OF THE INVENTION

Without limiting the scope of the invention, its background is described in connection with measurement-driven path loss and crowdsourced studies on network performance.

Prior work has addressed some aspects of measurement-driven analysis and crowdsourcing: (i) measurement-driven path loss studies, and (ii) crowdsourced studies on network performance. For example, many works have used detailed measurements from a particular area and/or a particular piece of hardware [1]-[4] to create path loss models for specific region types (e.g., urban or suburban). The goals of these studies were to produce models that were independent of the exact physical location and broadly applicable to any environment. In other work, crowdsourced experiments have focused on collecting network performance data such as rates and traffic patterns to use realistic user profiles to accurately model performance. For instance, in [5], [6] performance data was collected about LTE and 802.11 networks from a few thousand users over the course of a couple months.

SUMMARY OF THE INVENTION

The present invention includes an apparatus and method that uses terrain/geographical feature information for inferring various metrics for wireless propagation characterization including, but not limited to determining the number of measurements needed for accurate propagation estimation and a numerical evaluation of the propagation itself. The primary use of this method is in network drive-testing, where the method optimizes drive-testing routes to avoid over- and under-sampling of a region.

The present invention includes an apparatus and method for ensuring cell coverage by using the geographical features of a region to reduce in-field propagation experimentation by predicting the number of measurements required to accurately characterize its path loss. In particular, the present invention systematically identifies the impact of the measurement collection methodologies (wardriving and crowdsourcing) on the accuracy of path loss characterization of a particular region. An application is deployed that obtains wireless signal strengths and GPS locations of users worldwide. A problem is that the measurement density in these regions often fails to exceed the required bounds for accurately characterizing path loss. To overcome this problem, the method oversamples wireless signal strengths in suburban and downtown regions via local wardriving. Next, the method uses global users to find typical mobility patterns of each crowdsourced user. This information is used to compare the accuracy of wardriving and crowdsourcing in the path loss prediction for differing levels of measurements and number of users. Then, in the suburban and downtown regions in which wardriving is used, the geographical features of buildings, dense foliage, and free space is analyzed to determine the environmental differences between regions. The application, which can use a GeoRIPE framework, then uses statistical learning and is trained by the wireless signal strength and geographical feature datasets to form a decision structure that generally predicts the number of measurements required for a given geographical feature mix.

The present invention can use one or more of the following. A statistical learning framework that situationally predicts the number of measurements required to meet a specified path loss characterization precision is used. With this framework, geographical feature distribution input is used to suggest measurement collection requirements in a grid-like fashion over the target region. An application was developed and deployed to gather signal strength measurements from real users throughout the world. For example, the method can use a specially modified version of this application to collect high-density wardriving measurements from two distinct region types in a major metropolitan area. The role of common measurement collection strategies, crowdsourcing and wardriving, are compared to determine in path loss characterization. More specifically, these methods consider user clustering in crowdsourcing and frequency versus distance based wardriving approaches. The effect of land use on path loss characterization is determined thereby showing how geographical feature diversity plays a large role in determining regional measurement requirements. A strong correlation between the number of measurements required to accurately characterize the path loss in a region and the quantity of small, medium, and large buildings as well as foliage in an area was found. Finally, the framework is validated by comparing GeoRIPE predicted signal strength measurement distribution to a more uniformly spread wardriving measurement approach, showing improved path loss characterization precision using from 23% to 29% fewer measurements.

BRIEF DESCRIPTION OF THE DRAWINGS

For a more complete understanding of the features and advantages of the present invention, reference is now made to the detailed description of the invention along with the accompanying figures and in which:

FIG. 1B shows minimum measurements required (light is high, dark is low) of the same spatial distribution as FIG. 1A. FIG. 1C is a 3-D version of the same figure.

FIGS. 4A and 4B show the Regional Feature Distributions (FIG. 4A Downtown, FIG. 4B Suburban).

FIGS. 5A and 5B show Regional Feature Distribution Deviation (FIG. 5A Downtown, FIG. 5B Suburban).

FIGS. 6A and 6B show Wardriving Path Loss Precision for Different Methodologies (FIG. 6A Downtown, FIG. 6B. Suburban).

FIGS. 10A and 10B show Average Feature Distributions for Different MR Tiers see that while small buildings increase the path loss exponent itself, it decreases received power variability, while foliage increases received power variability. This trend is visualized for the downtown and suburban areas in FIGS. 10A and 10B (FIG. 10A Downtown, FIG. 10B Suburban).

FIGS. 11A and 11B show Regional MR Class Distributions (FIG. 11A Downtown, FIG. 11B Suburban).

FIGS. 12A and 12B show Regional Feature Versus Random Prediction Offsets (FIG. 12A Downtown, FIG. 12B Suburban).

FIGS. 13A and 5B show Measurement Collection Strategy Comparison between Uniform Wardriving and GeoRIPE (FIG. 13A Downtown, FIG. 13B Suburban).

DETAILED DESCRIPTION OF THE INVENTION

Figure 1A:
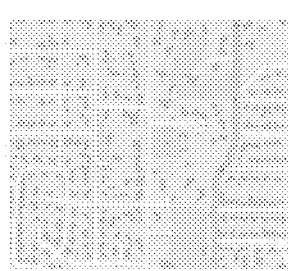
FIGS. 1A to 1C show the GeoRIPE Framework: using geographical features of a region (FIG. 1A) to infer the number of measurements required to predict path loss with a given accuracy level.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Ensuring cellular coverage is an important and costly concern for carriers due to the expense of in-field experimentation (i.e., wardriving). With the ubiquity of smartphones, apps, and social media, there has been an explosion of crowdsourcing to understand a vast array of trends and topics at a minimal cost to the organization. While cellular carriers might seek to replace the expensive act of wardriving with the nearly cost-free crowdsourcing, questions remain as to: (i) the accuracy of crowdsourcing, considering the lack of user control, (ii) the detection of when wardriving might still be required, and (iii) the quantification of how many additional in-field measurements to perform for a certain accuracy level. The inventors use geographical features of a region to reduce in-field propagation experimentation by predicting the number of measurements required to accurately characterize its path loss. In particular, the path loss prediction accuracy of wardriving and crowdsourcing by oversampling a suburban and downtown region is determined. Next, statistical learning is used to build a relationship between these geographical features and the measurements required. In doing so, the inventors determined that the number of measurements collected to achieve a certain path loss accuracy can be reduced by up to 29%.

To address multi-fold increases in cellular demand, carrier cell sizes have shifted downward to maximize network capacity. In doing so, the accurate and fine-grained coverage estimation of coverage becomes a critical issue for spatial reuse, intercell interference, and smooth handoffs between cells. Historically, in-field experimentation (i.e., wardriving) has been used to estimate the cellular propagation of a given region, which is costly for network operators due to the manpower and equipment required. The emergence of smartphones and their apps have offered a far cheaper alternative, recording in-field network observations directly from the cellular users (i.e., crowdsourcing). In fact, crowdsourcing can allow network observations to be recorded in areas to which in-field testers may not have access.

The present inventors address and overcome herein, the many questions and problems that prevent the full adoption of crowdsourcing as the primary measurement collection mechanism to characterize wireless propagation: (1) Can the randomness of the users and their mobility patterns contribute to accurate propagation prediction that approaches the structured, repeatable patterns of wardriving? (2) When is the level of crowdsourcing measurements sufficient to characterize a region? (3) If wardriving is required to supplement the crowdsourcing-based propagation prediction, how and where should the measurements be performed?

Prior work has addressed some aspects of measurement driven analysis and crowdsourcing: (i) measurement-driven path loss studies, and (ii) crowdsourced studies on network performance. For example, many works have used detailed measurements from a particular area and/or a particular piece of hardware [1]-[4] to create path loss models for specific region types (e.g., urban or suburban). The goals of these studies were to produce models that were independent of the exact physical location and broadly applicable to any environment. In other work, crowdsourced experiments have focused on collecting network performance data such as rates and traffic patterns to use realistic user profiles to accurately model performance. For instance, in [5], [6] performance data was collected about LIE and 802.11 networks from a few thousand users over the course of a couple months. However, in contrast to these works, the viability of a crowdsourcing technique over a wardriving methodology has not been explored, nor has there been an approach, which directly computes the number of infield measurements required to accurately characterize the path loss according to the geographical features of the environment.

In this work, the inventors use geographical features of a region to reduce in-field propagation experimentation by predicting the number of measurements required to accurately characterize its path loss. In particular, the inventors systematically identify the impact of the measurement collection methodologies (wardriving and crowdsourcing) on the accuracy of path loss characterization of a particular region. To do so, the inventors have deployed an Android-based application that captures wireless signal strengths and GPS locations of users worldwide. Since the measurement density in these regions do not often exceed the required bounds for accurately characterizing path loss, the inventors do two things. First, the inventors oversample wireless signal strengths in suburban and downtown regions via local wardriving. Second, the inventors use the global users to find typical mobility patterns of each crowdsourced user. Hence, the inventors compare the accuracy of wardriving and crowdsourcing in the path loss prediction for differing levels of measurements and number of users. Then, in the suburban and downtown regions which the inventors wardrive, the inventors analyze the geographical features of buildings, dense foliage, and free space to understand the environmental differences between regions. The GeoRIPE framework disclosed herein uses statistical learning and is trained by the wireless signal strength and geographical feature data sets to form a decision structure that generally predicts the number of measurements required for a given geographical feature mix.

The specific contributions of the present invention include, at least, the following:

The inventors introduce GeoRIPE, a statistical learning framework to situationally predict the number of measurements required to meet a specified path loss characterization precision. With this framework, geographical feature distribution input is used to suggest measurement collection requirements in a grid-like fashion over the target region.

The inventors developed and deployed an Android application the inventors developed to gather signal strength measurements from real users throughout the world. The inventors also use a specially modified version of this application to collect high-density wardriving measurements from two distinct region types in a major metropolitan area.

The inventors investigate the role of common measurement collection strategies, crowdsourcing and wardriving, in path loss characterization. More specifically, the inventors analyze these methods while considering user clustering in crowdsourcing and frequency versus distance based wardriving approaches.

The inventors also explore the effect of land use on path loss characterization, showing how geographical feature diversity plays a large role in determining regional measurement requirements. The inventors show especially strong correlation between the number of measurements required to accurately characterize the path loss in a region and the quantity of small, medium, and large buildings as well as foliage in an area.

Finally, the inventors validate the framework by comparing GeoRIPE predicted signal strength measurement distribution to a more uniformly spread wardriving measurement approach, showing improved path loss characterization precision using up to 29% fewer measurements.

This application is organized as follows. The inventors introduce the GeoRIPE framework. The inventors obtain wardriven and crowdsourced measurement sets. The inventors introduce the theory of measurement driven path loss characterization along with the path loss characterization process. The inventors investigate the underlying differences between wardriving and crowdsourcing measurements and their impact on path loss evaluation accuracy. The inventors also extend this analysis to understand the effect of regional geographical features on path loss evaluation. The inventors validate the GeoRIPE framework. Finally, the inventors provide an overview of related work in measurement driven path loss and distributed measurement collection strategies and the challenged in the same that are overcome by the present invention.

GeoRIPE framework. To illustrate the GeoRIPE1 framework of using geographical features to reduce in-field propagation experimentation, the inventors have depicted an aerial view of a region's terrain in FIG. 1A, shown with North on the top of the image. The terrain is classified into the following geographical features: buildings, dense foliage, and free space.

Figure 1B:
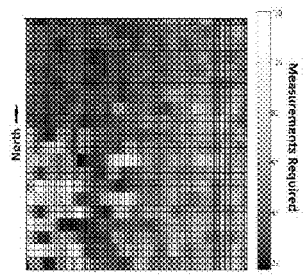
Figure 1C:
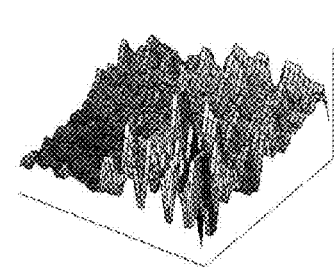

Since in-field testing is expensive, the goal is to predict the least number of propagation measurements required to characterize the path loss in the region according to a specified level of accuracy. For example, the path loss of a region that has entirely free space (e.g., a desert) could be characterized with very few measurements. However, diverse metropolitan region would require far more measurements to characterize. FIGS. 1B to 1C depict the end result of the GeoRIPE framework. The middle image depicts a two-dimensional overlay of the measurement density required to characterize the region shown in the left-most image. The Southwest portion of the region is the lightest color, which means that it requires the greatest number of measurements to characterize due to the high concentration of buildings. In contrast, the Northwest portion of the region is the darkest, which means that it requires the least number of measurements to characterize due to sparse building placement and less foliage. A three-dimensional version of the same figure can be seen in the right-most image to show the quantity of measurements required in each portion of the region.

A similar analysis could be done for a given region by an excessive amount of in-field testing and finding when each portion of the terrain converged to a particular level of path loss prediction accuracy. However, such an approach, by definition precludes any in-field testing reduction. While the inventors do oversample certain regions in this work, the inventors do so to train a statistical learning decision structure to infer the number of infield measurements required. As a result, for any mix of such terrain features, the inventors can avoid the two in-field testing extremes of: (i) too few measurements, resulting in an inaccurate path loss estimate, or (ii) too many measurements, resulting in excessive experimentation costs.

Crowdsourcing, wardriving, and geographical feature data sets. In this section, the inventors present a smartphone-based measurement gathering platform, which will be leveraged: (i) globally by Android users for us to understand typical spatial user distributions, and (ii) locally by us to gather a dense measurement set of wireless signal strengths in both a downtown region and suburban region. The inventors also introduce the geographical feature data set that the inventors use from the wardriving regions to establish a relationship between geodata and the attenuation of wireless signals.

Android-Based Measurement Gathering Platform. Google Play, the Android application marketplace, allows users across different carriers and hardware platforms to download the same applications that extend the phone's factory functionality. For this research, the inventors developed a smartphone application, distributed through Google Play, that allows users to scan the WiFi networks around them and use this data to set their router's wireless channel or simply to view the potential interference of other networks. Additionally, the application allows the users to opt in to data collection for this research, covered by an Institutional Review Board (IRB). If the user opts in to the research, the application on the user's device will log a measurement to the repository at an interval of four to six times daily to minimize user power consumption and data usage while still providing useful data. Each measurement contains the location where the data collection took place and information about the cellular and WiFi infrastructure available to the device at that location. Measurement times are chosen according to a uniform random distribution so that daily, weekly, and monthly patterns can be constructed, giving us crowdsourced spatial distributions of that user.

Figure 2:
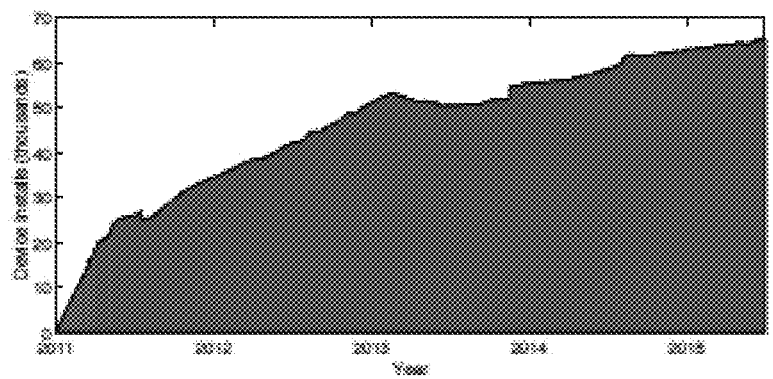
FIG. 2 shows the number of device installs over time.

Human Subject Participation. The inventors application has been downloaded over 400 k, and has over 66 k currently active devices. FIG. 2 shows user growth over the past several years. Currently, measurements are mostly from GSM-based devices, but also include collecting measurements from CDMA and LTE technologies.

With user permission, the inventors have gathered over 100 million cellular measurements and over 61 million WiFi measurements worldwide. The measurements include an instantaneous Received Signal Strength Indicator (RSSI), location and user state information, and other network parameters. The location and user state information consists of: latitude and longitude, an accuracy reading, and physical speed of the device. For devices not equipped with GPS hardware, the less accurate method of triangulation is used to determine the location of the device. For cellular networks, the name of the network and carrier type are also recorded. In some regions, the inventors use carrier information to determine operating frequency since some providers only operate on one frequency with a particular technology in certain areas.

Received Signal Strength in Android API. As mentioned previously, each cellular measurement contains an RSSI field. While the inventors now obtain RSSI readings in terms of dBm, most of the measurements were taken when the API reported RSSI in terms of Arbitrary Strength Units (ASU), which quantizes obtained RSSI values for GSM to 32 different levels shown in the equation below from the Android API.

$$P_{rx}(dBm)=2*P_{rx}(ASU)-113 \quad (1)$$

$$P_{rx}(ASU)=[0, 31] \quad (2)$$

The inventors consider Prx(ASU)=0 and 31 unusable since they correspond to SNR in an unlimited range. Not including these measurements, however, clips the natural distribution of RSSI readings at locations with measurements near the quantization limits. The lower and upper bounds set by omitting measurements where Prx(ASU)=31 and Prx(ASU)=0, respectively, move the average RSSI at certain distances from the tower. Distances closer to the tower that generally have higher RSSI measurements near the upper bound may have a lowered average RSSI. Conversely, distances farther from that tower that generally have lower RSSI measurements near the lower bound may have a heightened average RSSI. The bias in the movement of average RSSI near the boundaries could end up changing the value of the obtained path loss exponent.

While the exact values of RSSI and path loss exponents could be affected by the quantization error, the inventors are not evaluating absolute path loss accuracy, only relative accuracy in the experiments.

Global Crowdsourcing for User Spatial Distributions. In establishing a relationship from the geographical features of the environment to the wireless propagation, the inventors seek to have an extremely dense measurement set of wireless signal strengths for a given region. Hence, even for large cities with a sizable number of users, the footprint the inventors can achieve from crowdsourcing is less than that possible by wardriving. However, the global data set offers a view of how users spend their time and the spatial distribution of the measurements that can be crowdsourced. Therefore, for this work, the inventors consider a number of different spatial distributions of measurements that emerge from different users that opt in to this measurement study. These distributions can be used to consider the efficacy of using crowdsourcing to characterize the path loss in a region. As a result of this analysis and with additional growth in density of Android users, the inventors could refine the statistical learning to include these crowdsourced regions to infer wireless propagation. For the time being, the inventors will leverage wireless signal strengths from this wardriving data alone.

Local Wardriving for Wireless Signal Strengths. As previously alluded to, this local wardriving measurements serve three purposes. First, the wardriving data provides a structured, uniform measurement distribution over the region to contrast the inherently less uniform measurement spread of the crowdsourced measurement set. Second, the wardriving data provides a highly-dense measurement set collected with minimal user behavior and hardware variability. Third, the wardriving data needs to cover different types of regions that offer different geographical features to isolate feature characteristics and analyze the required number of measurements to characterize a region per feature type. To meet these three requirements, the inventors used a development version of this application to obtain a large number of measurements concentrated in two regions of a large metropolitan area, a suburban area and downtown area.

Figure 3:
FIG. 3 shows one of three phones placed around the car used to gather wardriving measurements.

Over the span of two weeks (over 30 in-car hours), the inventors collected 6.7 million wardriving measurements by placing LG Nexus 4 smartphones in a vehicle (shown in FIG. 3) and systematically driving throughout two regions. The measurements were obtained at a relatively constant speed of 30 mph.

The inventors select two different areas of the city for the focus of the wardriving measurements. The first area is a suburban region several miles north of the city center with lush greenery prevalent throughout and is predominantly residential. The second area is in downtown, where there is far less vegetation, and the buildings are far taller than the suburban structures with non-uniform heights. The goal is to use these two distinct regions to examine how differences in feature distribution affect the number of required measurements to characterize path loss to a certain degree of accuracy in each region.

Geographical Feature Data from Wardriving Regions. In order to obtain geographical feature information, the inventors utilized an open-access online resource, Open Street Maps (OSM) [7], to identify, outline, and label specific regional features and output them to an easily accessible data structure for parsing. To this end, the inventors manually cataloged hundreds of offices, parks, houses, and other features in both the suburban and downtown regions and grouped them into the feature category classes for the statistical learning system. With statistical learning, the number of training observations necessary for accurate divisions scales up proportionally with the number of features used in the training. Because of this, as well as the limited number of possible features to label in each region considered, it is necessary to divide all possible geographical features into relatively few bins for processing. With this in mind, the inventors selected five feature categories under which all features were labeled: small buildings, medium buildings, large buildings, high foliage, and open space. In this system, small buildings consist of buildings that are under 5 stories tall (ground footprint is not considered for the category, but is implicitly considered when calculating feature distribution in a region), medium buildings are between 5 and 15 stories tall, and large buildings are over 15 stories tall. High foliage areas in the regions the inventors consider are areas with a large number of trees, and open space is the area defined by the complement to the set of all other features combined (including roads, parking lots, etc.).

Feature distributions in the downtown and suburban regions we examine are shown in FIGS. 4A and 4B respectively. From this figure, the inventors find that the suburban area lacks medium and large buildings and boasts a higher area percentage of open space than the downtown region, as anticipated. In this manner the user is able to further differentiate and parse members of the open space set to derive additional feature categories.

In addition to the differences in feature distributions between regions, the inventors also want to examine the differences in how the features change over the regions. To do this, the inventors calculated the feature distribution in a moving window over each region. Treating the percentage of each feature in the windows as a random variable, the inventors them compute the standard deviation, giving us a picture of the feature variability as the inventors move across each region. The deviation of features can be seen for the downtown and suburban regions in FIGS. 5A and 5B, respectively.

Evaluating path loss variability. Path loss models attempt to predict the electromagnetic propagation as a function of distance. Many of these models rely on a priori information, using environmental details, a theoretical foundation, empirical findings, or some combination of the three for their prediction [2], [8], [9]. Other techniques operate under the assumption that a priori information is insufficient. These models supplement an existing model with a correction factor or factors based on measurements collected throughout a region to be modeled and tend to be more accurate than their a priori counterparts [10]. These active measurement models consist of two fundamental components: (i) how the measurements are gathered, and (ii) how they are incorporated into the model.

Path Loss Measurement and Supplemented Models. Others have studied the initial theoretical methodology of gathering active measurements for modeling path loss [11]. Lee proposed arced measurements at incremental distances from the transmitter while averaging measurements that fall within 20 to 40 wavelengths of each other, a claim corroborated by Shin using IEEE 802.11b measurements some years later [12]. In practice, it is often difficult to collect measurements strictly following the theoretically ideal guidelines due to environmental inaccessibility. This can be due to permission limitations, such as access restricted buildings or construction sites, or infrastructure limitations, where equipment setups are subject to the same mobility freedoms as the vehicles in which they operate. With a crowdsourced approach, a greater access diversity can be achieved with the limitations of a lack of control over data validity and input distribution. Due to these practical considerations, this work focuses on two popular measurement methodologies, vehicle-based wardriving and smartphone-based crowdsourcing, for this analysis.

One of the more recent path loss models utilizing collected measurements is one proposed by Robinson et al. [13]. Using the Technology For All (TFA) network in Houston, Tex., they utilized a modified Flexible Path Loss Exponent model with a terrain correction factor derived iteratively from collected measurements. The model is an extension of Friis' fundamental study [8] and can be written as:

$$P_{rx} = P_{tx} + 10\alpha\log(d) - 20\log(f) - 20\log\left(\frac{4\pi}{c}\right) \quad (3)$$

Here, Ptx and Prx are the transmitted and received signal powers, respectively, α is the path loss exponent, f is the transmit frequency, and c is the speed of light. In their work, the authors use existing wireless mesh nodes and detailed terrain information to determine sections that are likely to share a similar path loss exponent. They then incrementally gather measurements around the borders of these sections in a push-pull algorithm to refine the coverage estimate of the mesh node.

Obtaining a Path Loss Exponent. In this statistical learning approach, it is necessary to train a classifier with path loss exponent observations derived from existing measurements to motivate predictions in areas that lack those same measurements. The inventors borrow the idea of a spatially-dependent path loss exponent from Robinson et al. without the push-pull measurement adjustment algorithm, a reference node, and detailed terrain information (including material loss estimations). Instead the inventors use (3) in a moving window over the region, using linear regression to obtain a path loss exponent for each window. Since the measurements are obtained from many different towers distributed over the area, each using potentially different transmit powers at different heights, the inventors rely on a larger quantity of data to average out these inconsistencies. Since path loss follows a nonlinear decay with distance, averaging in this way can bias the obtained exponent to be lower than expected. However, the precision (defined according to the deviation from the average obtained exponent over several calculations using orthogonal measurements) is increased, which the inventors rely on more heavily for this statistical learning framework. To calculate the metric of standard deviation on the path loss exponent, the inventors divide the data considered into several independent sets of data, calculate path loss exponents for each independent set, and compute the standard deviation of the exponents derived. Again, this gives us a solid metric for path loss precision, even if the exponents themselves are biased by the data collection limitations.

Measurement distribution and geographical feature analysis. Despite that fact that there have been several works that suggest measurement distribution and geographical features play an enormous role in the resulting path loss characterization of a region, there has not been a study showing how these metrics can be used to quantify the number of measurements required to characterize an area. In this section, the inventors take a critical look at the impact of measurement distribution and geographical feature components on path loss precision. More specifically, the inventors compare measurement distributions obtained from crowdsourcing versus wardriving measurements, examine geographical feature components of the two metropolitan region types, and correlate these feature distributions with both path loss exponents as well as the number of measurements required to obtain a certain precision in characterization. The goal is to use regional geographical features to learn how to properly collect measurements, ensuring a predetermined precision in path loss characterization.

Wardriving versus Crowdsourcing. The goal is to see how close the characterization of a region's pathloss from crowdsourced data can come to the characterization of measurements collected via wardriving. The inventors predict that increasing the number of users in a region will make the characterization from crowdsourcing closer to the true characterization. The inventors investigate the level to which each additional user increases the understanding of pathloss in and area.

Wardriving. The wardriving measurements were collected in a distanced-based manner, meaning that each measurement was evenly spaced in distance from the previous one. This technique gave an even measurement density no matter the speed of the vehicle. The other way to collect wardriving data is to poll at even time intervals. This technique will lead to even spacing in time between measurements but will cause distance irregularities based on speed changes of the vehicle. In order to compare each technique, the inventors had to convert the collected measurements into a dataset that represents a timebased collection method. This was achieved by decreasing the number of samples collected at each speed in a linear fashion. This means that measurements collected at the lowest speeds were left intact, the measurements in the second slowest set of speeds were downsampled slightly, and so on. This mimics the time-based collection method by spreading out the distances between the data points collected at higher speeds. FIGS. 6A and 6B show the comparison of the two collection techniques. From the graphs the inventors can see that in both metropolitan region types the distance-based collection method converged to a more stable expectation of pathloss faster than the time-based collection method.

Figure 7A:
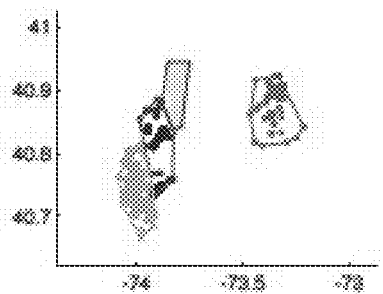
FIGS. 7A and 7B show defining crowdsourcing model with real user behavior (FIG. 7A Downtown, FIG. 7B Suburban).
Figure 7B:
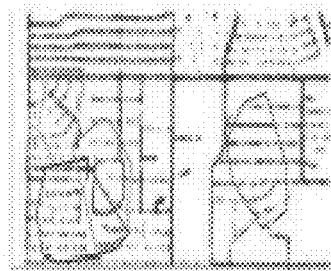
Figure 8A:
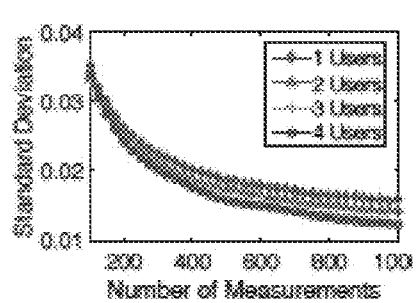
FIGS. 8A and 8B show Crowdsourcing Path Loss Precision for Different User Groups (FIG. 8A Downtown, FIG. 8B Suburban).
Figure 8B:
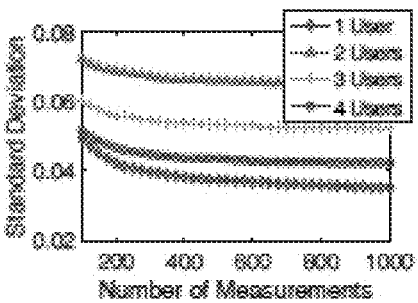

Crowdsourcing. For this analysis of crowdsourced distributions the inventors use real user mobility patterns to create a realistic model of how users contribute measurements to an area. The inventors selected users who had contributed the most measurements in any metropolitan area in the country. FIG. 7A shows the mobility patterns that the inventors used to define this crowd sourcing model. After defining these typical user patterns, the inventors overlayed them on the local data set, as seen in FIG. 7B, thereby superimposing patterns of crowd collected measurements so that only measurements within these areas would be used to calculate pathloss. This experiment was repeated for many different cluster locations to get an average precision over the region. The inventors also varied the number of clusters used in the calculation (one cluster per user). The standard deviation of the computed path loss exponent using differing numbers of measurements and numbers of clusters for the downtown and suburban regions are shown in FIGS. 8A and 8B, respectively. In these figures, the inventors see in both regions that as the inventors increase the number of user clusters, the standard deviation of the derived exponents drops faster with increasing number of measurements.

Figure 9:
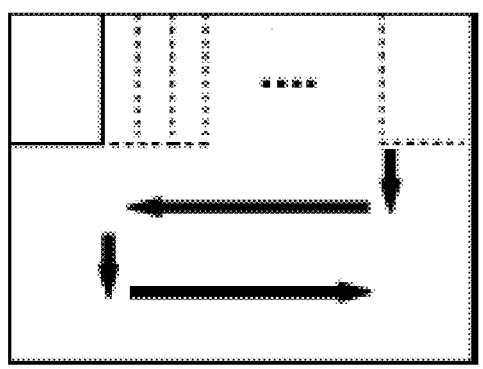
FIG. 9: Visualization of Algorithm 1.

Path Loss Metric and Geographical Feature Correlation. Using geographical features as a region specific identifier, the inventors want to understand how specific geographical features can be used to characterize path loss throughout a region. The inventors explored four different path loss related metrics to determine which had the closest relationship, and therefore the highest suitability, to be used as the target for the geographical feature based statistical learning approach. The four metrics the inventors examined are path loss exponent (PLE), differential path loss exponent (DPLE), number of measurements required for path loss convergence (MR), and the differential number of measurements required for convergence (DMR). The MR and PLE metrics are calculated for a given region using Algorithm 1, which is initialized with parameters listed in Table I. Algorithm 1 can be visualized as a sliding window filter moving across the region as illustrated in FIG. 9.

The inventors use this algorithm to determine a high resolution discrete map of the MR and PLE metrics over a region. Similarly, with the feature data for the region, the inventors can derive a high resolution discrete map of feature distributions using a similar windowing method. The differential metrics, DPLE and DMR, can be easily derived from column and row differentiation of the PLE and MR matrices, respectively. A corresponding differential feature distribution map can be derived in the same manner.

TABLE I

Spatial Feature and Path Loss Metric Algorithm Parameters.

| Parameter | Setting | Description |
|---|---|---|
| W | 1 km$^2$ | Moving window area |
| V | 20 | Number of vertical shifts |
| H | 40 | Number of horizontal shifts |
| σ | 0.01 | Desired std. dev. |
| S | 20 | Measurement step size |
| G | 30 | Number of orthogonal groups |

Algorithm 1: Computing PLE and MR Metrics

```
Data: measurements (M)
Result: V by H PLE and MR matrices
Initialize Parameters;
for v ← 1 to V do
   for h ← 1 to H do
      PLE(v,h) ← ComputeExponent(∀M ∈ W);
      group(1..G) ← ∀M ∈ W split into G sets;
      P_size ← 0;
      while σ_temp ≥ σ do
         σ_temp ← ∞;
         P_size ← P_size + S;
         for g ← 1 to G do
            P ← P_size elements ∈ group(g);
            expnt(g) ← ComputeExponent(P);
         end
         σ_temp ← ComputeStdDev(expnt(1..G));
      end
      MR(v,h) ← P_size;
      W ← W horizontally shifted by 1;
   end
   W ← W vertically shifted by 1;
end
```

With matching metric and feature maps, the inventors can correlate each metric with the corresponding feature map to obtain a sample Pearson correlation coefficient using Equation 4.

$$r_{ij} = \frac{\sum_{k=1}^{n}(x_{ik}-\bar{x}_i)(y_{jk}-\bar{y}_j)}{\sqrt{\sum_{k=1}^{n}(x_{ik}-\bar{x}_i)^2 \sum_{k=1}^{n}(y_{jk}-\bar{y}_j)^2}} \quad (4)$$

In this equation, n is the number of samples, xik is sample k of feature i, yjk is the sample k of path loss metric j, and xi and yj are the average distribution of feature i and the average of path loss metric j, respectively.

The inventors want to select a path loss metric to use as a training class for the statistical learning framework that has the highest correlation coefficients with the feature set to provide clear decision boundaries. The correlation coefficients for each of the path loss metrics in the downtown and suburban regions are shown Tables II and III respectively.

TABLE II

Downtown Metric-Feature Correlation Coefficients

| Metric | S. Building | M. Building | L. Building | Foliage | Open Space |
|---|---|---|---|---|---|
| PLE | −0.23 | 0.02 | −0.05 | 0.17 | 0.18 |
| DPLE | −0.05 | −0.03 | 0.02 | −0.04 | 0.07 |
| MR | −0.32 | 0.34 | 0.49 | −0.10 | −0.23 |
| DMR | −0.06 | 0.05 | 0.03 | 0.01 | −0.02 |

TABLE III

Suburban Metric-Feature Correlation Coefficients

| Metric | S. Building | M. Building | L. Building | Foliage | Open Space |
|---|---|---|---|---|---|
| PLE | 0.36 | NA | NA | 0.31 | −0.38 |
| DPLE | −0.15 | NA | NA | 0.05 | 0.05 |
| MR | −0.53 | NA | NA | 0.44 | −0.27 |
| DMR | −0.06 | NA | NA | 0.01 | 0.04 |

The inventors can see that the MR metric has the highest overall correlation coefficient magnitude and is likely the best contender for a simple decision tree based learning algorithm. Interestingly, the inventors see that for the suburban region in particular, the correlation coefficient for the MR metric are negative with small buildings and positive with foliage, while positive with both for the PLE metric. This suggests that while increased buildings and foliage contribute to a larger path loss exponent (as expected), the number of measurements required to drop below the 0.01 path loss exponent standard deviation increases only with the percentage of foliage. From this result, the inventors can see that while small buildings increase the path loss exponent itself, it decreases received power variability, while foliage increases received power variability. This trend is visualized for the downtown and suburban areas in FIGS. 10A and 10B.

Using geographical features to improve measurement collection efficiency. In the previous section, the inventors showed that diversity in geographical features and the spatial distribution of the wireless signal strength measurements can have an impact on the number of measurements required for a given accuracy of path loss prediction. Here, the inventors use a machine learning framework to generally build the relationship between the geographical feature mix and the resulting measurement number required for a given propagation prediction accuracy. To do so, the inventors map the measurements required (MR) results obtained from Algorithm 1 to discrete classes, such that each class becomes a range of measurements required for the standard deviation threshold. The inventors then use the geographical feature distributions for each corresponding MR result as qualifying features for training a decision tree.

Classifier Training and Validation. To validate the GeoRIPE framework, the inventors divide the MR results for the downtown and suburban regions into 6 same-sized class bins. As seen in FIGS. 11A and 11B, the class groupings are not uniform for either of the regions. Unsurprisingly, the downtown region class distribution has a higher mean number of required measurements than the suburban region due to it is higher geographical feature variability. To train each the decision tree classifier, it is important to allow equal training weights per class as much as possible to balance the tree and not over-fit the data. For this, the inventors removed observations from the training set until all classes had an equal number of observations. The inventors further divided this set of observations into two separate training and validation observation sets, again being sure to have equal class representation in each set. The inventors then trained the decision tree classifier with the training set and predicted MR classes with the validation set. Due to the linear relationship between MR metric and class, it is important to look at not only the prediction accuracy in choosing the correct class, but also the distribution of predicted class offsets when the correct class is not chosen. This is because a lower average offset between the predicted and correct MR class is arguably more important than the accuracy in choosing the correct class alone.

FIGS. 12A and 12B show the class prediction offset magnitudes for using feature prediction to choose a class and choosing a random class. This result shows that for both the downtown and suburban region, the average predicted class offset is significantly lower using the feature prediction than choosing a class at random, even if there may not be a very high accuracy in actually predicting the correct class.

Measurement Savings over Wardriving. Using the trained and validated decision tree classifier, the inventors want to see the magnitude of measurement savings offered over wardriving by using the heterogeneous prediction of the GeoRIPE measurement collection strategy. To do this, the inventors divided the regions into several uniformly sized tiles. The inventors then gathered measurements from several orthogonal subsets of measurements in each tile according to both a uniform wardriving distribution as well as the predicted heterogeneous distribution given by Equation 5.

$$p_x = \frac{M_x}{\sum_{\hat{x}}^{X} M_{\hat{x}}} \quad (5)$$

Here, x is a single section in the set of all tiles X, $p_x$ is the fraction of measurements to be collected in section x, and $M_x$ is the set of predicted MR values of tile x. The inventors collected several orthogonal subsets of measurements in each tile for an increasing number of overall measurements in each region. For each orthogonal subset in each tile, the inventors calculated a path loss exponent and computed the standard deviation of the path loss exponents in each tile. The standard deviation for all tiles was averaged at each number of total measurements, resulting in FIGS. 13A and 13B.

Figures 13A, 13B:
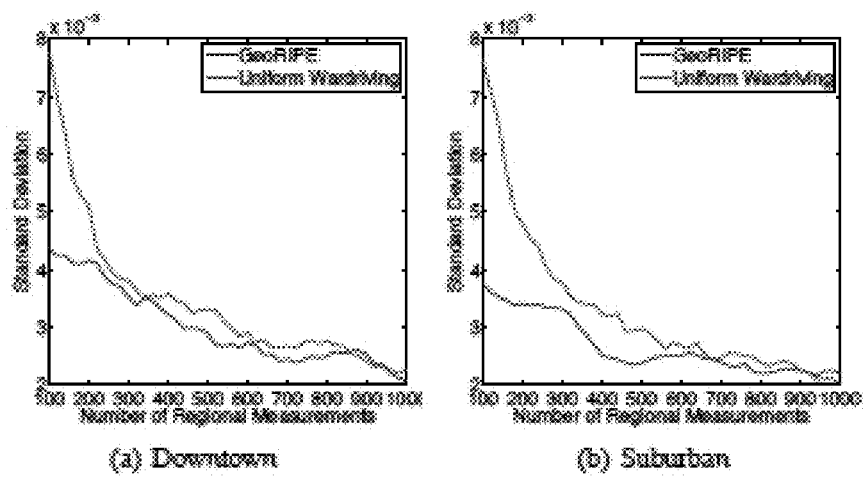

FIGS. 13A and 13B shows that the GeoRIPE converges to a high precision with far fewer measurements than the uniform wardriving collection strategy. There are two main situations that help to explain this phenomenon. The first situation is when a tile does not have many features that contribute to path loss variability and is over sampled by the uniform wardriving strategy and extra measurements to be wasted. From the experiment, uniform wardriving used up to 40% more measurements in some tiles without a noticeable path loss characterization precision improvement (less than 5% improvement). Conversely, to achieve a similar level of path loss characterization precision, GeoRIPE uses up to 29% fewer measurements overall. The second situation is when a tile has features that contribute to high path loss variability (such as a high percentage of foliage as seen earlier). From the experiment, the use of GeoRIPE yields a path loss exponent standard deviation reduction of up to 61% in some instances while only collecting 33% more measurements and a 23% increase in regional path loss characterization accuracy using the same number of measurements overall. In examining FIGS. 13A and 13B, with these situations in mind, the measurement savings of GeoRIPE is only substantial in situations with a low number of measurements, when the specific situations discussed apply. After a certain measurement density, all tiles will likely be saturated in terms of path loss characterization precision requirements, causing the measurement collection distribution to no longer have as prominent an effect.

Measurement Collection Approaches. Due to the low cost of crowdsourcing from smartphones, the technique has been used by many other groups to collect data about wireless networks. In a study by Huant et al. [5], LTE performance data was collected by creating an Android application named 4GTest. This application gained 3,000 users during 2 months of data collection and collected data that focused on media streaming by mobile clients. With this data, [5] was able to show that with the download speed increase seen with LTE networks, the traffic bottleneck shifted from the network to the processing power of the mobile devices. In [6], an Android application was again used to capture network speed data. This study focused on comparing the speeds of 802.11 networks to the speeds of LTE networks in major cities around the globe. Neidhardt et al. used a crowdsourced infrastructure to provide an open source and more accurate base station location and coverage estimation system [14]. While they had promising results on the base station localization aspect, they concede that cellular coverage estimation was lacking with their purely crowdsourced measurements, especially in urban environments with diverse terrain features. This work focuses on the minimum measurement requirements according to different geographical features of a given region.

Measurement-Driven Path Loss Evaluation. There have been several measurement studies that strive to more accurately characterize path loss in specific region types. Hata et al. [2] and Okumura et al. [15] specifically focus on accurate characterization in urban regions. Using measurements gathered by [15] in Tokyo, Japan, Hata et al. empirically derived a path loss prediction formula with correction factors for various region types such as large-city urban, small-city urban, suburban, and open areas. Additionally, the Hata model considers base station transmitter height. Similar to the path loss prediction curves found by [15] in Japan, Allsebrook et al. [16] evaluated path loss prediction curves for three British cities: Birmingham, Bath, and Bradford. Akimoto et al. [4] derived a model based on gathered measurements in a rural area using the 2 and 5 GHz bands. Similarly, [1] studied measurements collected in a suburban neighborhood at 5.7 GHz as did [3] with measurements taken in Istanbul in the GSM-900 band. More recently, Robinson et al. sought to minimize the number of measurements necessary to accurately characterize mesh node coverage in the TFA network in Houston [13]. Their work uses an online push-pull measurement gathering approach, taking very few active measurements on an existing deployment based on terrain features in the area. In contrast, this approach aims to analyze geographical features of a region and predict the number of measurements required to obtain an accurate estimate of path loss.

The inventors built the GeoRIPE framework which predicts the minimum number of in-field measurements required to accurately characterize the path loss of a region according to that region's geographical features. To do so, the inventors leveraged and compared two different measurement collection strategies of wardriving and crowdsourcing. The inventors found that while crowdsourcing does not characterize a region as well as wardriving, it can approach the accuracy of the wardriving path loss prediction, especially as number of users in a region increases. More importantly, since crowdsourcing requires minimal costs to carriers, it may be a viable and sufficient collection strategy to preclude costly wardriving. To find if such measurements would be sufficient for a given area, the inventors oversampled a suburban and downtown region via wardriving and used geographical feature data with statistical learning. The inventors found that this technique, as opposed to wardriving at a uniform periodicity, required up to 29% percent fewer measurements for a similar accuracy result. Additionally, when using a fixed number of measurements regionally, this technique had a 23% average improvement in path loss characterization precision.

It is contemplated that any embodiment discussed in this specification can be implemented with respect to any method of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially" of or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

[1] S. Ghassemzadeh, H. Worstell, and R. Miller, "Wireless neighborhood area network path loss characterization at 5.7 GHz," in Proc. of IEEE VTC-Fall, 2010.

[2] M. Hata, "Empirical formula for propagation loss in land mobile radio services," Vehicular Technology, IEEE Transactions on, vol. 29, no. 3, pp. 317-325, 1980.

[3] B. Hanci and I. Cavdar, "Mobile radio propagation measurements and tuning the path loss model in urban areas at GSM-900 band in Istanbul Turkey," in Proc. of IEEE VTC-Fall, 2004.

[4] M. Akimoto, T. Shimizu, and M. Nakatsugawa, "Path loss estimation of 2 GHz and 5 GHz band FWA within 20 km in rural area," Proc. of ISAP, 2006.

[5] J. Huang, F. Qian, A. Gerber, Z. M. Mao, S. Sen, and 0. Spatscheck, "A close examination of performance and power characteristics of 4g lte networks," in Proceedings of the 10th international conference on Mobile systems, applications, and services. ACM, 2012, pp. 225-238.

[6] S. Deng, R. Netravali, A. Sivaraman, and H. Balakrishnan, "Wifi, lte, or both?: Measuring multi-homed wireless internet performance," in Proceedings of the 2014 Conference on Internet Measurement Conference. ACM, 2014, pp. 181-194.

[7] "Open street maps," www.openstreetmap.org, license: http://www.openstreetmap.org/copyright.

[8] H. T. Friis, "A note on a simple transmission formula," proc. IRE, vol. 34, no. 5, pp. 254-256, 1946.

[9] B. Sklar, "Rayleigh fading channels in mobile digital communication systems i. characterization," Communications Magazine, IEEE, vol. 35, no. 7, pp. 90-100, 1997.

[10] C. Phillips, D. Sicker, and D. Grunwald, "A survey of wireless path loss prediction and coverage mapping methods," Communications Surveys & Tutorials, IEEE, vol. 15, no. 1, pp. 255-270, 2013.

[11] W. C. Lee, "Estimate of local average power of a mobile radio signal," Vehicular Technology, IEEE Transactions on, vol. 34, no. 1, pp. 22-27, 1985.

[12] H. Shin, "Measurements and models of 802.11 b signal strength variation over small distances," Ph.D. dissertation, University of Delaware, 2010.

[13] J. Robinson, R. Swaminathan, and E. W. Knightly, "Assessment of urban-scale wireless networks with a small number of measurements," in Proc. of ACM MobiCom, 2008.

[14] E. Neidhardt, A. Uzun, U. Bareth, and A. Kupper, "Estimating locations and coverage areas of mobile network cells based on crowdsourced data," in Wireless and Mobile Networking Conference (WMNC), 2013 6th Joint IFIP. IEEE, 2013, pp. 1-8.

[15] Y. Okumura, E. Ohmori, T. Kawano, and K. Fukuda, "Field strength and its variability in VHF and UHF landmobile radio service," Rev. Elec. Commun. Lab, vol. 16, no. 9, pp. 825-73, 1968.

[16] K. Allsebrook and J. Parsons, "Mobile radio propagation in british cities at frequencies in the VHF and UHF bands," Vehicular Technology, IEEE Transactions on, vol. 26, no. 4, pp. 313-323, 1977.

What is claimed is:

1. An apparatus for determining cell coverage in a region with reduced in-field propagation measurements comprising:

a cell phone or equivalent device comprising a code segment that obtains wireless signal strength and global positioning system coordinates;

a data base that comprises geographical features of the region; and a processor that comprises a non-transitory computer readable medium, comprising instructions stored thereon, that when executed by a computer having a communications interface, one or more databases and one or more processors communicably coupled to the interface and one or more databases, perform the steps comprising:

predicting a number of measurements required to accurately characterize a path loss in the region by obtaining RSSI readings in terms of dBm, wherein the measurements are obtained when an API reports RSSI in terms of Arbitrary Strength Units (ASU), which quantizes obtained RSSI values in the equation:

$$P_{rx}(dBm)=2*P_{rx}(ASU)-113 \quad (1)$$

$$P_{rx}(ASU)=[0,31] \quad (2)$$

to determine relative path loss accuracy;

oversampling a suburban and a downtown region from cell measurements that comprise signal strength and global positioning system coordinates to determine the path loss prediction accuracy of wardriving and crowdsourcing; and using a statistical learning framework to build a relationship between the geographical features and the measurements, thereby reducing the number of measurements needed to determine path loss accuracy.

2. The apparatus of claim 1, wherein the measurements from crowdsourcing are obtained by loading an application on one or more cell phones, obtaining permission to use the data captured by the cell phone, and obtaining the wireless signal strength and the global positioning system coordinates from the one or more cell phones.

3. The apparatus of claim 1, further comprising the step of optimizing drive-testing routes to prevent over- and under-sampling of a region.

4. The apparatus of claim 1, further comprising the step of using the cell coverage to improve spatial reuse, intercell interference, and smooth handoffs between cells.

5. The apparatus of claim 1, wherein the step of using the statistical learning framework is defined further as comprising the steps of situationally predicting the number of measurements required to meet a specified path loss characterization precision wherein the framework comprises a geographical feature distribution input that is used to suggest measurement collection requirements in a grid-like fashion over a target region.

6. The apparatus of claim 1, wherein the step of determining the path loss prediction accuracy of wardriving is defined further as comprising the step of collecting high-density wardriving measurements from two or more distinct region types in a major metropolitan area.

7. The apparatus of claim 1, wherein the step of determining the path loss prediction accuracy is defined further as comprising clustering in crowdsourcing and frequency versus distance based wardriving.

8. The apparatus of claim 1, further comprising the steps of determining the effect of land use on path loss characterization, showing how geographical feature diversity plays a large role in determining regional measurement requirements, wherein a correlation between the number of measurements required to accurately characterize the path loss in a region and a quantity of small, medium, large buildings, and foliage in an area.

9. The apparatus of claim 1, further comprising the step of validating the framework by comparing a predicted signal strength measurement distribution to a uniformly spread wardriving measurement approach, and showing improved path loss characterization precision using 23% to 29% fewer measurements.

10. The apparatus of claim 1, wherein the step of determining a high resolution discrete map of the path loss exponent (PLE) and number of measurements required for path loss convergence (MR) metrics over a region by using the algorithm:

```
Data: measurements (M)
Result: V by H PLE and MR matrices
Initialize Parameters;
for v ← 1 to V do
 | for h ← 1 to H do
 |  |  PLE(v,h) ← ComputeExponent(∀M ∈ W);
 |  |  group(1..G) ← ∀M ∈ W split into G sets;
 |  |  P_size ← 0;
 |  |  while σ_temp ≥ σ do
 |  |  |  σ_temp ← ∞;
 |  |  |  P_size ← P_size + S;
 |  |  |  for g ← 1 to G do
 |  |  |  |  P ← P_size elements ∈ group(g);
 |  |  |  |  expnt(g) ← ComputeExponent(P);
 |  |  |  end
 |  |  |  σ_temp ← ComputeStdDev(expnt(1..G));
 |  |  end
 |  |  MR(v,h) ← P_size;
 |  |  W ← W horizontally shifted by 1;
 |  end
 |  W ← W vertically shifted by 1;
end.
```

11. A method to determine cell coverage in a region with reduced in-field propagation measurements comprising:

obtaining geographical features of the region;

predicting a number of measurements required to accurately characterize a path loss by obtaining RSSI readings in terms of dBm, wherein the measurements are obtained when an API reports RSSI in terms of Arbitrary Strength Units (ASU), which quantizes obtained RSSI values in the equation:

$$P_{rx}(dBm)=2*P_{rx}(ASU)-113 \quad (1)$$

$$P_{rx}(ASU)=[0,31] \quad (2)$$

to determine relative path loss accuracy;

determining the path loss prediction accuracy of wardriving and crowdsourcing by oversampling a suburban and a downtown region from cell measurements that comprise signal strength and global positioning system coordinates; and using a statistical learning framework to build a relationship between the geographical features and the measurements required, thereby reducing the number of measurements needed to determine path loss accuracy.

12. The method of claim 11, wherein the measurements from crowdsourcing are obtained by loading an application on one or more cell phones, obtaining permission to use the data captured by the cell phone, and obtaining the wireless signal strength and the global positioning system coordinates from the one or more cell phones.

13. The method of claim 11, further comprising the step of optimizing drive-testing routes to prevent over- and under-sampling of a region.

14. The method of claim 11, further comprising the step of using the cell coverage to improve spatial reuse, intercell interference, and smooth handoffs between cells.

15. The method of claim 11, wherein the step of using the statistical learning framework is defined further as comprising the steps of situationally predicting the number of measurements required to meet a specified path loss characterization precision wherein the framework comprises a geographical feature distribution input that is used to suggest measurement collection requirements in a grid-like fashion over a target region.

16. The method of claim 11, wherein the step of determining the path loss prediction accuracy of wardriving is defined further as comprising the step of collecting high-density wardriving measurements from two or more distinct region types in a major metropolitan area.

17. The method of claim 11, wherein the step of determining the path loss prediction accuracy is defined further as comprising clustering in crowdsourcing and frequency versus distance based wardriving.

18. The method of claim 11, further comprising the steps of determining the effect of land use on path loss characterization, showing how geographical feature diversity plays a large role in determining regional measurement requirements, wherein a correlation between the number of measurements required to accurately characterize the path loss in a region and a quantity of small, medium, large buildings, and foliage in an area.

19. The method of claim 11, further comprising the step of validating the framework by comparing a predicted signal strength measurement distribution to a uniformly spread wardriving measurement approach, and showing improved path loss characterization precision using 23% to 29% fewer measurements.

20. The method of claim 11, further the step of determining a high resolution discrete map of the path loss exponent (PLE) and number of measurements required for path loss convergence (MR) metrics over a region by using the algorithm:

```
Data: measurements (M)
Result: V by H PLE and MR matrices
Initialize Parameters;
for v ← 1 to V do
 | for h ← 1 to H do
 |  | PLE(v,h) ← ComputeExponent(∀M ∈ W);
 |  | group(1..G) ← ∀M ∈ W split into G sets;
 |  | P_size ← 0;
 |  | while σ_temp ≥ σ do
 |  |  | σ_temp ← ∞;
 |  |  | P_size ← P_size + S;
 |  |  | for g ← 1 to G do
 |  |  |  | P ← P_size elements ∈ group(g);
 |  |  |  | expnt(g) ← ComputeExponent(P);
 |  |  | end
 |  |  | σ_temp ← ComputeStdDev(expnt(1..G));
 |  | end
 |  | MR(v,h) ← P_size;
 |  | W ← W horizontally shifted by 1;
 | end
 | W ← W vertically shifted by 1;
end.
```

21. A computerized method for determining cell coverage in a region with reduced in-field propagation measurements, the method comprising:
 obtaining geographical features of the region;
 predicting a number of measurements required to accurately characterize a path loss using a processor;
 determining the path loss prediction accuracy of wardriving and crowdsourcing by oversampling a suburban and a downtown region from cell measurements that comprise signal strength and global positioning system coordinates with the processor; and
 using statistical learning to build a relationship between the geographical features and the measurements required, thereby reducing the number of measurements needed to determine path loss accuracy by obtaining RSSI readings in terms of dBm, wherein the measurements are obtained when an API reports RSSI in terms of Arbitrary Strength Units (ASU), which quantizes obtained RSSI values in the equation:

$$P_{rx}(dBm) = 2*P_{rx}(ASU) - 113 \tag{1}$$

$$P_{rx}(ASU) = [0,31] \tag{2}$$

to determine relative path loss accuracy.

22. A non-transitory computer readable medium for determining cell coverage in a region with reduced in-field propagation measurements, comprising instructions stored thereon, that when executed by a computer having a communications interface, one or more databases and one or more processors communicably coupled to the interface and one or more databases, perform the steps comprising:
 obtaining geographical features of the region;
 predicting a number of measurements required to accurately characterize a path loss using a processor by obtaining RSSI readings in terms of dBm, wherein the measurements are obtained when an API reports RSSI in terms of Arbitrary Strength Units (ASU), which quantizes obtained RSSI values in the equation:

$$P_{rx}(dBm) = 2*P_{rx}(ASU) - 113 \tag{1}$$

$$P_{rx}(ASU) = [0,31] \tag{2}$$

to determine relative path loss accuracy;
 determining the path loss prediction accuracy of wardriving and crowdsourcing by oversampling a suburban and a downtown region from cell measurements that comprise signal strength and global positioning system coordinates with the processor; and
 using statistical learning to build a relationship between the geographical features and the measurements required, thereby reducing the number of measurements needed to determine path loss accuracy; and
 at least one of storing or displaying the results obtained thereby.

* * * * *